United States Patent [19]

Davis et al.

[11] Patent Number: 5,947,240
[45] Date of Patent: Sep. 7, 1999

[54] LOAD VIBRATION ISOLATION APPARATUS

[75] Inventors: Toren S. Davis; David A. Osterberg, both of Maricopa, Ariz.

[73] Assignee: Honeywell, Inc.

[21] Appl. No.: 08/794,556

[22] Filed: Feb. 3, 1997

[51] Int. Cl.⁶ .................................................. F16F 7/10
[52] U.S. Cl. .................. 188/378; 188/298; 188/299.1; 188/312; 267/136; 267/64.25; 267/221
[58] Field of Search .................................. 267/136, 195, 267/221, 122, 64.25; 188/299.1, 378, 312, 317, 314; 248/562, 636, 631, 638, 550; 280/124.08

[56] References Cited

U.S. PATENT DOCUMENTS

| | | | |
|---|---|---|---|
| 3,186,702 | 6/1965 | Taylor | 267/1 |
| 3,204,945 | 9/1965 | Taylor | 267/64 |

(List continued on next page.)

FOREIGN PATENT DOCUMENTS

| | | |
|---|---|---|
| 1176693 | 8/1964 | Germany . |
| 4004204 | 8/1991 | Germany . |
| 1388098 | 3/1975 | United Kingdom . |
| 9523076 | 8/1995 | WIPO . |
| 9834049 | 8/1996 | WIPO . |
| 9832620 | 7/1998 | WIPO . |

OTHER PUBLICATIONS

Document entitled "Adaptable Passive Viscous Damper (an Adaptable D–Strut™)" by Porter Davis and David Cunningham of Honeywell Inc., Satellite Systems Operation; Glendale, AZ 85308 and Andy Bicos and Mike Enright of McDonnell Douglas Aerospace; Huntington Beach, CA 92647; pp.1–12.

Document entitled "Actuator With Built–in Viscous Damping for Isolation and Structural Control" by T. Tupper Hyde and Eric H. Anderson of Space Engineering Research Center; Department of Aeronautics and Astronautics; Massachusetts Institute of Technology, Cambridge, Mass. 02139.

Document entitled "An Advanced D–Strut™" by L. Porter Davis and Steven D. Ginter of Honeywell Inc. Satellite Systems Operation presented at the Damping 91 Conference, San Diego, California; pp. 1–17.

Document entitled "Design of a D–Strut™ and Its Application Results in the JPL, MIT, and LaRC Test Beds" by L. Porter Davis and Brian J. Workman of Honeywell Inc., Satellite Systems Operation; Glendale, AZ and Cheng–Chih Chu of Jet Propulsion Laboratory; Pasadena, California and Eric H. Anderson of Massachusetts Institute of Technology, Space Engineering Research Center; Cambridge, Massachusetts; Presented at the American Institute of Aeronautics and Astronautics Structural Dynamics Meeting; Dallas, Texas; Apr. 13, 1992; pp. 1–7.

Document entitled "Advanced 1.5 Hz Passive Viscous Isolation System" by Porter Davis, David Cunningham and John Harrell; presented at the 35th AIAA SDM Conference; Hilton Head, South Carolina; Apr. 1994, copyright 1994, Honeywell Inc. pp. 1–11.

(List continued on next page.)

*Primary Examiner*—Peter M. Poon
*Attorney, Agent, or Firm*—Charles J. Ungemach

[57] ABSTRACT

A damping mounting structure for use between two members for isolating motion changes which incorporates a plurality of dampers connected between the two members in a closed geometric shape and which uses cross connections between the dampers located on opposite sides of the geometric shape so that translation motion between the two members is damped less than rotational motion between the two members and an accumulator to provide pressurization of the system but to prevent loss of pressure due to slow rotational vibrations, one-way valves are connected between the system and the accumulator to allow fluid flow only from the accumulator to the system and not from the system to the accumulator and pressure relief or burp valves are used to allow short duration fluid flow from system back to the accumulator when a predetermined system over-pressure is exceeded.

17 Claims, 2 Drawing Sheets

U.S. PATENT DOCUMENTS

| | | |
|---|---|---|
| 3,256,005 | 6/1966 | Taylor ..................................... 267/64 |
| 3,303,856 | 2/1967 | Taylor ..................................... 138/31 |
| 3,933,344 | 1/1976 | Taylor ................................. 267/64 A |
| 3,947,004 | 3/1976 | Taylor ................................. 267/65 R |
| 3,980,358 | 9/1976 | Davis ..................................... 308/173 |
| 4,031,978 | 6/1977 | Taylor ..................................... 180/91 |
| 4,064,977 | 12/1977 | Taylor ................................... 188/317 |
| 4,150,819 | 4/1979 | Taylor ................................... 267/136 |
| 4,242,917 | 1/1981 | Bennett et al. ........................... 74/5.5 |
| 4,254,988 | 3/1981 | Taylor et al. ........................... 296/190 |
| 4,265,344 | 5/1981 | Taylor ................................... 188/322 |
| 4,389,045 | 6/1983 | Taylor ................................. 267/8 R |
| 4,532,856 | 8/1985 | Taylor ..................................... 92/168 |
| 4,535,876 | 8/1985 | Taylor ................................... 188/311 |
| 4,548,041 | 10/1985 | Taylor ..................................... 60/632 |
| 4,558,767 | 12/1985 | Taylor ................................... 188/282 |
| 4,564,048 | 1/1986 | Taylor ..................................... 138/31 |
| 4,582,303 | 4/1986 | Taylor ................................ 267/64.13 |
| 4,585,099 | 4/1986 | Taylor ................................ 188/322.19 |
| 4,591,030 | 5/1986 | Antkowiak ............................. 188/268 |
| 4,591,033 | 5/1986 | Taylor ................................... 188/317 |
| 4,611,794 | 9/1986 | Taylor ................................ 267/64.13 |
| 4,628,579 | 12/1986 | Taylor ..................................... 29/422 |
| 4,630,805 | 12/1986 | Taylor ................................ 267/64.13 |
| 4,638,895 | 1/1987 | Taylor et al. ........................... 188/280 |
| 4,674,398 | 6/1987 | Taylor ..................................... 91/459 |
| 4,718,648 | 1/1988 | Taylor ................................ 267/64.13 |
| 4,730,706 | 3/1988 | Taylor et al. ........................... 188/297 |
| 4,738,339 | 4/1988 | Taylor ................................ 188/322.19 |
| 4,749,071 | 6/1988 | Taylor ................................ 188/322.19 |
| 4,760,996 | 8/1988 | Davis ..................................... 267/122 |
| 4,768,627 | 9/1988 | Taylor ................................... 188/280 |
| 4,773,164 | 9/1988 | Taylor et al. ............................. 33/520 |
| 4,793,451 | 12/1988 | Taylor ................................... 188/316 |
| 4,815,574 | 3/1989 | Taylor et al. ........................... 188/280 |
| 4,819,919 | 4/1989 | Taylor ................................ 267/64.13 |
| 4,848,525 | 7/1989 | Jacot et al. ............................. 188/378 |
| 4,867,043 | 9/1989 | Antkowiak ........................... 92/165 R |
| 4,867,286 | 9/1989 | Taylor ................................... 188/282 |
| 4,877,114 | 10/1989 | Taylor ................................... 188/285 |
| 4,877,226 | 10/1989 | Taylor ................................... 267/196 |
| 4,892,051 | 1/1990 | Taylor et al. ............................. 114/1 |
| 4,988,244 | 1/1991 | Sheldon et al. . |
| 5,121,128 | 6/1992 | Van Lidth de Jeude et al. ...... 343/741 |
| 5,133,435 | 7/1992 | Taylor ................................... 188/381 |
| 5,139,104 | 8/1992 | Moscicki . |
| 5,149,131 | 9/1992 | Sugasawa et al. . |
| 5,219,051 | 6/1993 | Davis ..................................... 188/378 |
| 5,249,783 | 10/1993 | Davis ..................................... 267/217 |
| 5,265,552 | 11/1993 | Taylor ................................... 114/219 |
| 5,305,981 | 4/1994 | Cunningham et al. ................. 248/550 |
| 5,318,156 | 6/1994 | Davis ..................................... 188/298 |
| 5,332,070 | 7/1994 | Davis et al. ........................... 188/298 |

OTHER PUBLICATIONS

Document entitled "Second Generation Hybrid D–Strut™" by Porter Davis and Delano Carter of Honeywell Inc., Satellite Systems Operation; Glendale, AZ 85308 and T. Tupper Hyde of Space Engineering Research Center; Massachusetts Institute of Technology, Cambridge, Massachusetts 02139; presented at the SPIE Smart Structures and Materials Conference; Feb. 1995; San Diego, California, pp. 1–15.

Document entitled "Satellite Isolation and Structural Control"; prepared by Porter Davis and Tim Hintz; Jan. 1995.

LOAD VIBRATION ISOLATION APPARATUS

The invention was made with Government support under Contract F29601-95-C-0192, awarded by the Department of the Air Force. The Government has certain rights in the invention.

BACKGROUND OF INVENTION

1. Field of the Invention

The present invention relates to an improved apparatus operable to isolate a load from vibration of a base device to which it is attached and more particularly to provide a novel pressurizing scheme for a system such as is described in a copending application of David A. Osterberg entitled Load Isolator Apparatus, filed Jan. 29, 1997, having Ser. No. 08/790,647 and which is assigned to the assignee of the present invention. In the copending application, a novel damping concept is described to provide a soft damped suspension system between the load and the vehicle in translational directions while providing a stiff damped suspension system between the load and the vehicle in rotational directions. The present invention improves the stability of the system and protects against damage.

2. Description of the Prior Art

The above referred to copending Osterberg application has utility in various fields including automotive, test machinery and the like, but for convenience, the copending application and the present application are described in the environment of a payload, such as a satellite, mounted on a vibratable base such as a launching vehicle. In the copending application it is explained that it is often difficult to support the payload at the center of gravity and accordingly it is normal to mount the end of the payload at the end of the launch vehicle. The mounting apparatus previously used includes elastic means such as springs or dampers so as to allow enough motion of the payload along the translational axes (i.e. the launch axis, and the two axes perpendicular thereto) to maintain the alignment of its inertial measurement units in the payload, such as gyros and accelerometers. However, because the mounting is at one end, small rotational movements at the bottom of the payload result in large translational movements at the top which is undesirable since there is a limited amount of "rattle space" (i.e. the space between the payload and the aerodynamic outer shell). Accordingly, it is desirable to soften the translational motions while stiffening the rotational motions.

In the prior art, the payload has been supported by independent spring/damper units, typically mounted at various angles to provide the proper stiffness in each degree-of-freedom. In such a configuration, each spring/damper unit operates independent of the others. Other approaches have been to distribute the stiffness and damping around the base of the payload. The rotational stiffness of these isolation systems are limited by the center-of-gravity offset of the payload and the diameter across the base(mounting circle) and, while changing the angles of the spring/damper units allows some freedom in selecting the proper stiffness, the results are limited.

The invention of the copending Osterberg application overcomes the problems of the prior art by cross coupling opposite damping elements, rather than having them operate independently, to provide a soft damped suspension in transition and stiff damped suspension in rotation. The invention also describes an accumulator connected to the cross coupling conduits to provide pressurization for the fluid in the conduits and to receive fluid excess due to thermal expansion. Providing preload pressure to the system is desirable to prevent cavitation in the system during dynamic motion. In order to prevent a softening of the rotational damping due to the flow of fluid into the accumulator when the pressure of the fluid increases due to rotational forces, the conduits to the accumulator were made much more restrictive than the conduits in cross coupling. This usually has the desired effect since pressure changes due to most rotational forces are much more rapid than pressure changes due to temperature changes, and no significant amount of fluid would flow to the accumulator during the rapid pressure changes produced by normal rotational forces but fluid would still flow to the accumulator during the much slower temperature changes. However, it is desirable that the system provide hard damping even when very slow rotational forces are encountered at near static conditions and under these circumstances, the restrictions in the lines to the accumulator would not prevent fluid flowing out of the cross connections to the accumulator which results in the softening of damping. While the accumulator could be removed entirely, (and in some cases an accumulator may not be necessary), for most applications, pressures due to extreme temperature changes or very large rotational forces or pressures due to temperature changes added to the pressure due to rotational forces could become high enough to cause structural damage to the system.

BRIEF DESCRIPTION OF THE INVENTION

The present invention provides a plurality of one-way valves to prevent fluid flow from the damper system to the accumulator and provides high pressure relief valves to momentarily release pressure in the damper systems when it exceeds a predetermined value to prevent damage. The briefly released fluid through the pressure release valves may be fed back to the accumulator so as to prevent loss of fluid from the system and since the release is so brief, it does not operate to soften the system to rotational forces.

DETAILED DESCRIPTION OF THE PREFERRED EMBODIMENTS

Figure 1A:
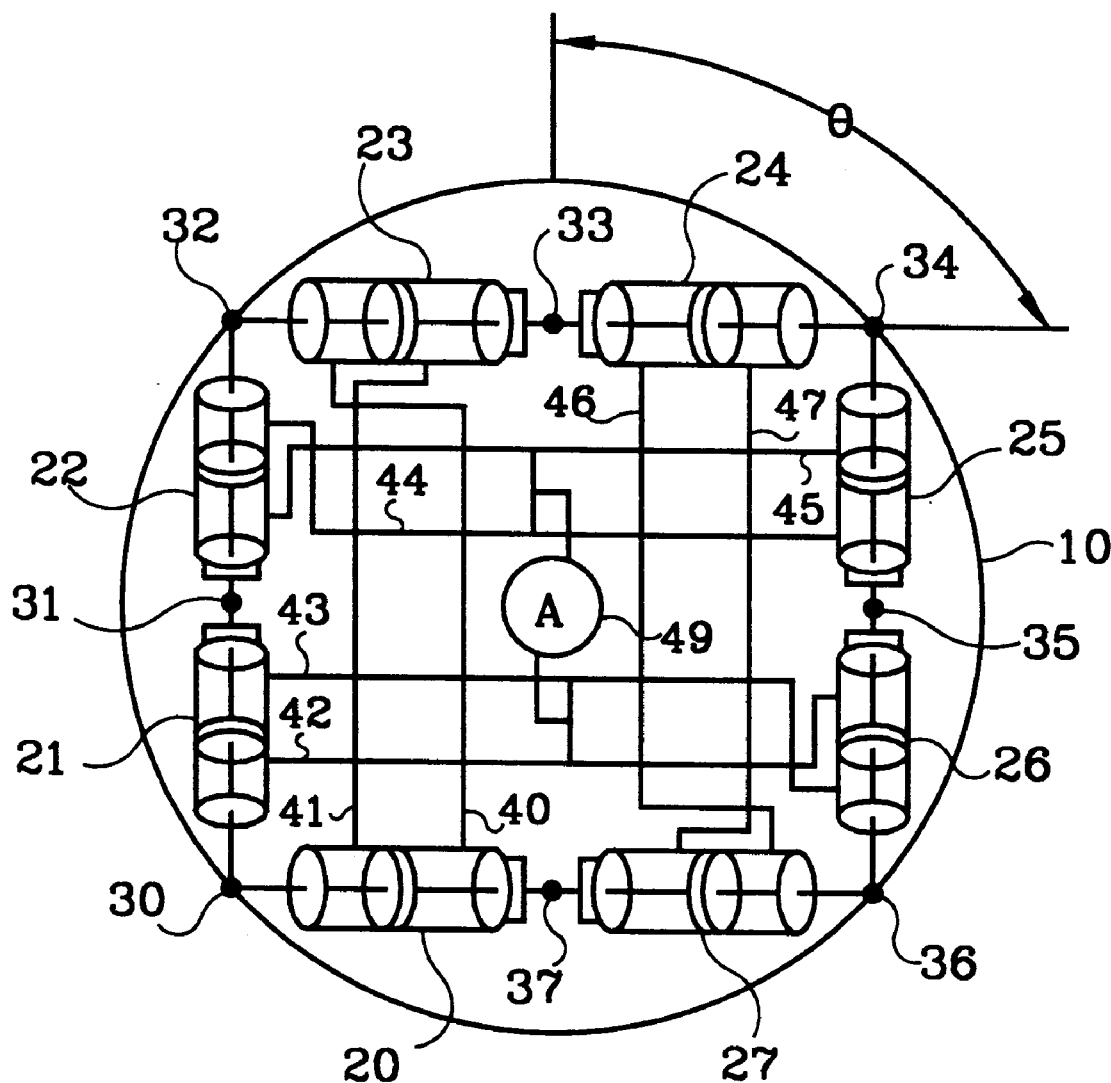
FIGS. 1a and 1b show a top view and side view of an isolation section between a vehicle and a payload; and, FIG. 2 shows the cross coupling arrangement of the present invention.
Figure 1B:
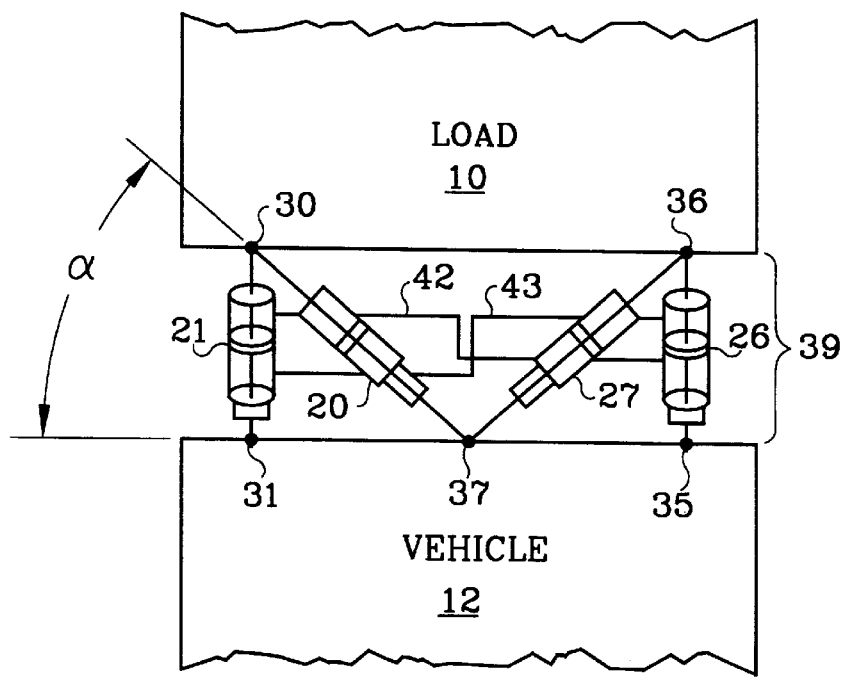

FIGS. 1a and 1b show a load 10, which may be the payload or satellite which is carried by the vehicle 12, which may be the booster rocket of a missile, separated by a vibration isolation section 29 containing a plurality of vibration isolators or dampers 20–27 respectively, each having first and second chambers separated by a piston as will be better described in connection with FIG. 2. As will be seen in FIG. 2 and as shown in the above referred to co-pending Osterberg application, each of the dampers 20–27 has a spring connected in parallel therewith to provide the desired stiffness but these springs are not shown in FIG. 1a and 1b to avoid confusion. While 8 dampers have been shown arranged in a rectangular fashion in FIGS. 1a and 1b, it is to be understood that as many dampers as desired may be used and they may be arranged in any convenient pattern. A minimum of 6 dampers arranged in a triangular or hexipodal pattern would be necessary to provide the desired support for the load 10.

It is seen that dampers 20 and 21 are connected together at a common point 30 to the load 10, dampers 21 and 22 are connected at a common point 31 to the vehicle 12, dampers 22 and 23 are connected at a common point 32 to the load 10, dampers 23 and 24 are connected at a common point 33 to the vehicle 12, dampers 24 and 25 are connected at a common point 34 to the load 10, dampers 25 and 26 are connected at a common point 35 to the vehicle 12, dampers 26 and 27 are connected at a common point 36 to the load 10 and dampers 27 and 20 are connected at a common point 37 to the vehicle 12. While I have shown the piston of each damper connected to the piston of the adjacent dampers, these connections can be independent and connected to the load 10 and the vehicle 12 at individual points. Each spring/damper is at an angle $\alpha$ between the vehicle 12 and the load 10 as seen from the side in FIG. 1b and at an angle $\theta$ between the vehicle 12 and the load 10 as seen from the top in Figure 1a. By adjusting angles $\alpha$ and $\theta$, the ratio of the various stiffnesses and damping in the rotational and translational axes may be adjusted. Unfortunately, the stiffness and damping about the rotational axes can only be controlled very slightly by changing the damper angles and while the rotational stiffness and damping can be better adjusted by spacing the dampers apart in larger and smaller mounting circles, this changes the space requirements of the system.

Figure 2:
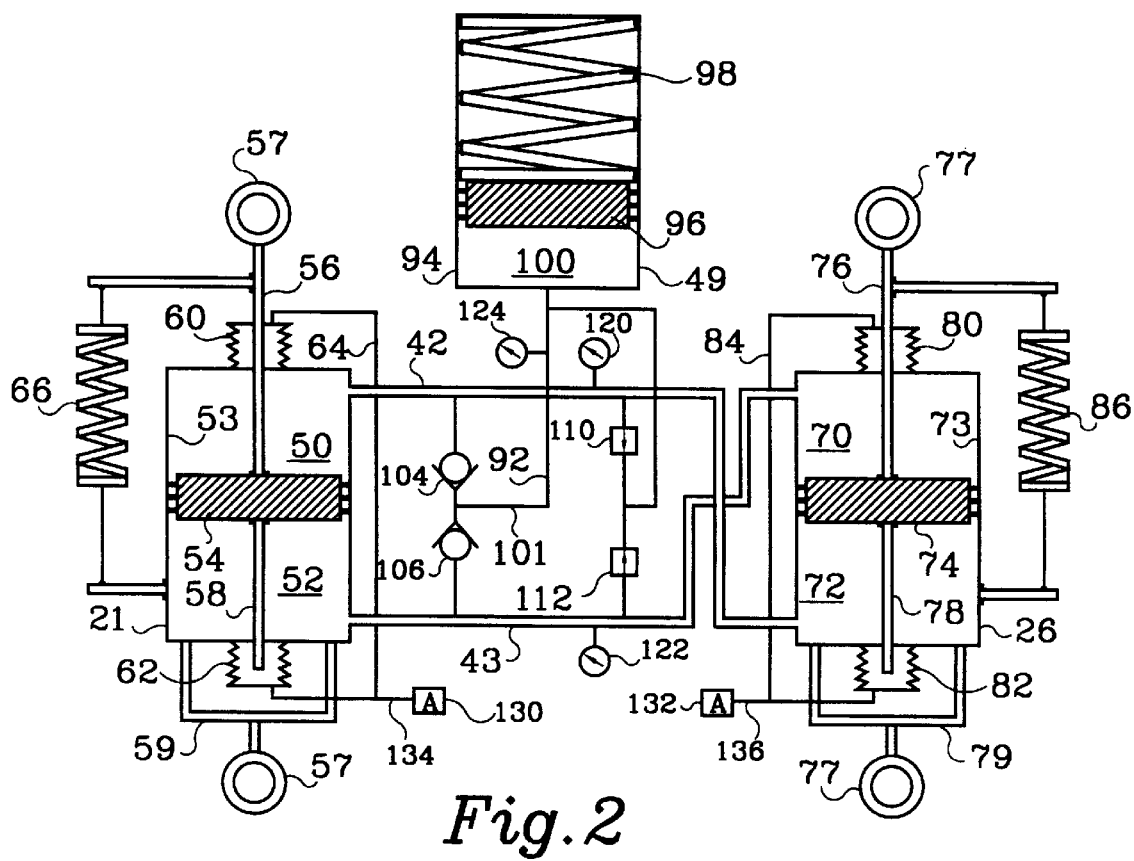

In the present invention, cross coupling conduits 40–47 are supplied to allow fluid flow between oppositely placed damper chambers and an accumulator 49 is connected to each cross coupled conduit by connections which may be better seen in FIG. 2.

In FIG. 2, two oppositely located dampers 21 and 26 are shown as an example, it being understood that each of the dampers and its oppositely placed counterpart in FIGS. 1a and 1b are similarly interconnected. In FIG. 2, damper 21 is shown having a first or upper chamber 50 and a second or lower chamber 52 separated by a piston 54. A first piston rod 56 extends upwardly from piston 54 to the exterior of damper 21 where it will be connected to load 10 at point 30 (not shown in FIG. 2) by a pivot 57. A second piston rod 58 extends downwardly from piston 54 to the exterior of damper 21 where it is not connected to anything. The purpose of piston rod 58 is to provide an area on the lower surface of piston 54 which has the same area exposed to the fluid in the first and second chambers 50 and 52. This allows piston 54 to displace equal volumes (although of opposite signs) of the incompressible fluid in both chambers 50 and 52 when piston rod 56 is moved in or out of damper 21.

The housing 53 of damper 21 is shown connected by a "U" shaped structure 59 extending downwardly for connection to vehicle 12 at point 31 (not shown in FIG. 2) by another pivot 57.

Low pressure hermetic seals are shown using an upper or first bellows 60 and a lower or second bellows 62 on either end of damper 21 to provide a motion transmitting fluid seal for chambers 50 and 52. A conduit 64 joints the interiors of bellows 60 and 62 respectively and is selected to be relatively non-restrictive to fluid flow. High pressure sliding seals (not shown in FIG. 2) protect the low pressure hermetic seals and are located where shaft 56 and 58 protrude through housing 53. It is understood that various other sealing techniques can be used including sliding non-hermetic seals alone without effecting the operation of the present invention. High pressure sliding seals also impede fluid flow from chamber 50 to chamber 52 and are located between piston 54 and housing 53. A spring 66 is shown mounted in FIG. 3 in a parallel load path with damper 21 to provide static stiffness. The spring arrangement can also be co-axial or distributed as in a flexible structure without effecting the operation of the present invention.

Damper 26 is arranged the same as damper 21 having first and second chambers 70 and 72 separated by a piston 74, a piston rod 76 attached to piston 74 extending upward for connection to load 10 at point 36 (not shown in FIG. 2) through a pivot 77 and a piston rod 78 attached to piston 74 and extending downward to equalize the areas. The housing of damper 26 is shown connected by a "U" shaped structure extending downwardly for connection to vehicle 12 at point 35 (not shown in FIG. 2) through another pivot 77. Low pressure hermetic seals are shown using an upper or first bellows 80 and lower or second bellows 82 to provide a motion transmitting fluid seal for chambers 70 and 72. A conduit 84 connects the interiors of bellows 80 and 82 to permit fluid flow therebetween. High pressure sliding seals (not shown in FIG. 2) protect the low pressure hermetic seals and are located where shaft 76 and 78 protrude through housing 73. High pressure sliding seals also impede fluid flow from chamber 70 to chamber 72 and are located between piston 74 and housing 73. A spring 86 is mounted in a parallel load path with damper 26 to provide stiffness. Damper 26 operates the same as damper 21.

The fluid conduit 42 is shown in FIG. 2 connected between the first chamber 50 of damper 21 and the second chamber 72 of damper 26. Similarly, the conduit 43 is shown connected between the second chamber 52 of damper 21 and the first chamber 70 of damper 26. Accumulator 49 is shown having a housing 94 and a piston 96 positioned by a spring 98 to provide a pressurized chamber 100 within the housing 94 which operates to pressurize the system. A more restrictive conduit 101 from accumulator 49 is connected to conduits 42 and 43 through one-way or ball valves 104 and 106 respectively. Ball valves 104 and 106 are connected to permit flow only from accumulator 49 to conduits 42 and 43. Each of the oppositely positioned pairs of dampers in FIG. 1 is connected in the same fashion. It should also be understood that while I have shown a single accumulator 49 in FIG. 1 connected to all of the conduits 40–47, a plurality of accumulators could be used each connected to different pairs of conduits. After all connections are made, the system is evacuated and is filled with the incompressible fluid.

It is seen that translational motion of load 10 with respect to vehicle 12 causes the two dampers 21 and 26 of FIG. 2 to see the same direction and magnitude of motion. If, for example, payload 10 moves upward with respect to vehicle 12 then piston rods 56 and 76 of FIG. 2, move upward as do pistons 54 and 74. The viscosity of the fluid and the length and diameters of lines 42 and 43 can be selected to provide the proper damping of this motion. No significant amount of fluid flows between conduits 42 and 43 or back through conduit 101 as will be explained below.

The same action, above described, occurs with each of the oppositely disposed dampers in the arrangement of FIGS. 1a and 1b so that with translational motions, the cross coupling arrangements of conduits 40–47 provide the desired damping for the payload 10.

On the other hand, rotational motion of the payload 10 with respect to vehicle 12 causes the dampers 21 and 26 to see motion in opposite direction which may or may not be of equal magnitude depending on the angles of the damper and where the center of rotation of the payload 10 is located. If, for example, payload 10 is rotated clockwise in FIG. 1b around a line perpendicular to the plane of the Figure and passing through point 37, this motion causes point 30 to rise and point 36 to lower relative to the vehicle 12. Responding to this, damper 21 would see piston rod 56 and piston 50 try to rise while damper 26 would see piston rod 76 and piston 74 try to lower. However, since chambers 50 and 72 are connected by line 42 and filled with incompressible fluid, the motion is resisted by the fluid pressure in chambers 50 and 72. Since, as mentioned, accumulator 49 is connected by a conduit 101 to the first and second one way or ball valves 104 and 106, the other side of which are connected to conduits 42 and 43 respectively, fluid may only flow from accumulator 49 through conduit 101 and valves 104 and 106 to conduits 42 and 43 respectively. Ball valves 104 and 106 prevent fluid flow from conduits 42 and 43 to accumulator 49 and thus prevent leakage of fluid and loss of pressure when the rotational forces cause pistons 54 and 74 to move in opposite directions. This increases the rotational stiffness over that of a conventional system since this rotation is resisted by both the springs and the hydraulics.

The same action, above described, occurs with each of the oppositely disposed dampers in the arrangement of FIGS. 1a and 1b so that with rotational motions the cross coupling arrangements of conduits 40–47 provide the desired damping for the payload 10.

The system thus arranged can withstand most normal pressure increases due to temperature variations although extreme conditions might be harmful to the mechanical structure of the system. Also, the system can withstand most pressure increases due to rotational forces acting on pistons 54 and 74 except possibly for unusually high forces. When temperature expansion and rotational forces occur at the same time, the combination of temperature expansion and pressure due to rotational forces may exceed the desired limit for pressure. In order to avoid structural damage to the system due to extreme pressure, a pair of pressure relief or "burp" valves 110 and 112 are shown connected between conduits 42 and 43 and accumulator 49 by a conduit 116. Burp valves 110 and 112 are set so that when a predetermined pressure is exceeded, a short duration flow release occurs. The burp valves 110 and 112 are also shown to be one-way as seen by the arrows therein so that the short duration fluid flow may only occur from conduits 42 and 43 to the accumulator 49, and not from the accumulator 49 to the conduits 42 and 43. Thus when the preset pressure is exceeded in either or both of lines 42 and 43, the burp valves will quickly release a little fluid to line 116 and accumulator 49 to quickly lower the pressure. The short period of time that burp valves 110 and 112 are open is not sufficient to significantly lower the pressure in the system and the damping due to rotational forces is not made significantly softer.

Pressure indicators 120, 122 and 124 may be attached to conduits 42, 43 and 101 so as to enable an observer to monitor the pressures therein. Also, if desired, hand or electrically operated valves (not shown) may be connected between ball valves 104 and 106 and conduits 42 and 43 respectively as well as between burp valves 110 and 112 and conduits 42 and 43 respectively so as to disable the operation of the valves if it is determined that no pressures able to produce damage to the system will be encountered.

In the event that the pressure build up in bellows 60, 62, 80 and 82 due to temperature variations is expected to exceed the capability of the various bellows to expand, additional accumulators 130 and 132 connected to lines 64 and 84 respectively by conduits 134 and 136 may be employed. To save cost, accumulators 130 and 132 may also be combined into a single accumulator.

It is seen that we have provided a system for damping the vibrations between a vehicle and a load mounted thereto so that translational vibrations are softly damped and rotational vibrations are stiffly damped and that we have done so without losing the hard damping pressure when slow rotational vibrations are encountered and still without allowing pressure to damage the system. Many obvious alterations to the structures shown in connection with the preferred embodiment will occur to those having skill in the art. For example, while we have shown piston type dampers, bellows or other type dampers may also be employed and while we have shown eight dampers in a rectangular configuration, other numbers of dampers and different configurations may be employed. Also, the mounting need not necessarily be at the bottom of the load and may be placed elsewhere, for example at the center of gravity. Similarly, ball valves may be replaced by other one-way type valves and other pressure release valves may be employed. The ball valves and the pressure relief valves could also be connected between the dampers and the accumulator rather than between the conduits and the accumulator. As mentioned, it will be understood that each of the cross coupled damper pairs of FIG. 1 will operate similarly to the example shown in connection with FIG. 2 and that the accumulator 49 shown in FIG. 2 may be common to all cross coupled pairs or each pair may employ its own accumulator. Similarly, accumulators 130 and 132 may be a single accumulator and all of the pairs may use a single accumulator. Accordingly, we do not wish to be limited to the specific structures used to describe the preferred embodiments of the invention.

The embodiments of the invention in which an exclusive property or right is claimed are defined as follows:

1. A vibration isolation system comprising:

first and second dampers cross connected by first and second conduits to provide soft damping for translational motions and hard damping for rotational motions and wherein rotational motions produce increased pressure in the system;

an accumulator to provide a pressurize source of fluid for the system; and, one-way fluid flow apparatus connected between the first and second dampers and the accumulator to permit fluid flow from the accumulator to the first and second dampers to maintain sufficient pressure in the system and to block fluid flow from the first and second dampers to the accumulator due to pressure increases occurring with rotational motions.

2. The vibration isolation system of claim 1 further including:

a pressure release apparatus connected between the accumulator and the first and second dampers, said pressure release apparatus set to permit a short duration flow of fluid from the first and second dampers when the pressure of the system exceeds a predetermined value.

3. The vibration isolation system of claim 1 wherein the first and second dampers comprise first and second cylinders separated by a piston to form first and second chambers in each cylinder, and the first and second conduits connect the first chamber of the first cylinder with the second chamber of the second cylinder and the second chamber of the first cylinder with the first chamber of the second cylinder so that with translational motions the pistons of the first and second cylinders move in the same direction but with rotational motion, the pistons of the first and second cylinders move in opposite directions.

4. The vibration isolation system of claim 3 further including:

a pressure release apparatus connected between the accumulator and the first and second dampers, said pressure release apparatus set to permit a short duration flow of fluid from the first and second dampers when the pressure of the system exceeds a predetermined value.

5. A damping system for use in mounting a first member to a second member, comprising:

a first fluid chamber connected to the first member;

a second fluid chamber connected to the second member;

first means connecting the first and second chambers so that an increase in volume of the first chamber is accompanied by a decrease in volume of the second chamber;

a third fluid chamber connected to the first member;

a fourth fluid chamber connected to the second member;

second means connecting the third and fourth chambers so that an increase in volume of the third chamber is accompanied by a decrease in volume of the fourth chamber;

a first fluid passage connecting the first and fourth chambers;

a second fluid passage connecting the second and third chambers;

a reservoir providing a source of pressurized fluid; and, one-way flow apparatus connected between the first and second passages and the reservoir to permit fluid flow from the reservoir to the system and to prevent fluid flow from the system to the reservoir.

6. Apparatus according to claim 5 further including a pressure relief apparatus connected to the first and second fluid passages to permit a short duration flow of fluid from the system when the pressure exceeds a predetermined value.

7. Apparatus according to claim 6 wherein the pressure relief apparatus is connected to the reservoir so that the short duration flow of fluid from the system is fed back to the reservoir.

8. Apparatus according to claim 5 wherein the first and second chambers are formed by a cylinder having a movable piston therein and the third and fourth chambers are formed by a cylinder having a movable piston therein.

9. A damping arrangement for mounting a first member to a second member so that translational motion therebetween is less damped than rotational motion therebetween, comprising:

a plurality of dampers, each damper having first and second expandable fluid chambers connected so that expansion of one of the first and second chambers is normally accompanied by contraction of the other of the first and second chambers and each damper having first and second external connectors with the first external connector of each damper connected to the first external connector of another damper to form a plurality of first support connections and with the second external connector of each damper connected to the second external connector of another damper to form a plurality of second support connections;

means connecting the plurality of first support connections to the first member and connecting the second plurality of support connections to the second member to provide damping support between the first and second members;

a plurality of fluid conduits with a first one of the fluid conduits joining the first expandable chamber of a first damper with the second expandable chamber of a second damper to permit fluid flow therebetween and a second of the fluid conduits joining the first expandable chamber of the second damper to the second expandable chamber of the first damper to permit fluid flow therebetween so that with a first translational movement between the first and second members the first expandable chambers of the first and second dampers both expand while the second expandable chambers of the first and second dampers both contract but with first rotational movement between the first and second members, the first expandable chamber of the first damper and the second expandable chamber of the second damper both expand while the second expandable chamber of the first damper and the first expandable chamber of the second damper both contract;

a fluid reservoir to provide a source of pressurized fluid for the first, second, third and fourth chambers; and, one-way valve apparatus connected between the first, second, third and fourth chambers and the reservoir to permit fluid flow from the reservoir to the system and to block fluid flow from the system to the reservoir.

10. Apparatus according to claim 9 further including a pressure relief apparatus connected between the first, second, third and fourth chambers and the fluid reservoir to permit short duration flow of fluid from first, second, third and fourth chambers to the fluid reservoir when the pressure therein exceeds a predetermined value.

11. Apparatus according to claim 10 wherein the number of dampers is eight and the connections of the first and second support connections to the first and second members forms a closed shape.

12. Apparatus according to claim 11 wherein the first and second ones of the dampers are disposed on opposite sides of the shape.

13. Apparatus according to claim 12 wherein third, fourth and fifth dampers are located respectively across the rectangle from sixth, seventh and eighth dampers and further including a third, fourth and fifth of the fluid conduits joining the first expandable chamber of the third, fourth and fifth dampers with the second expandable chamber of the sixth, seventh and eighth dampers respectively to permit fluid flow therebetween and sixth, seventh and eighth of the fluid conduits joining the first expandable chamber of the sixth, seventh and eighth dampers to the second expandable chamber of the third, fourth and fifth dampers respectively to permit fluid flow therebetween.

14. Apparatus according to claim 13 wherein the plurality of dampers each comprise a housing having a piston therein separating the housing into the first and second chambers and a piston rod connected to each piston extends out of the housing to form the first external connector and a connector from each housing forms the second external connector.

15. Apparatus for dampingly supporting a payload of a missile from a launch vehicle movable along a launch axis so that the payload may respond to translational motions between the payload and the launch vehicle with soft damping but respond to rotational motions between the payload and the launch vehicle with hard damping comprising:

a plurality of at least six fluid dampers each including a housing and a joining device which separates the housing into first and second changeable volume chambers, each damper connected between the payload and the launch vehicle at angles with respect to the launch axis to provide damping support therebetween and so that together, when viewed along the launch axis, the dampers form a closed geometrical shape around the launch axis to provide support between the payload and the launch vehicle;

a plurality of fluid conduits one each joining a first chamber in one each of the dampers to a second chamber in another each of the dampers located across the geometrical shape therefrom so that when translational force along the launch axis occurs the volume of the first chamber of each damper is changed in a direction to cause fluid in the second chamber of its oppositely disposed damper to change volume in the opposite direction to provide soft damping and so that when rotational force between the payload and the launch vehicle occurs, the volume of the first chamber of each damper is changed in a direction to cause fluid in the second chamber of its oppositely disposed damper to change volume in the same direction to provide hard damping;

a source of pressurized fluid; and one-way flow apparatus connecting the source of pressurized fluid to the fluid dampers to permit fluid to flow between the source of pressurized fluid and the dampers and block fluid flow between the dampers and the source of pressurized fluid.

16. Apparatus according to claim 15 further including pressure relief apparatus connected between the source of pressurized fluid and the dampers to permit short duration fluid flow from the dampers to the source of pressurized fluid.

17. Apparatus according to claim 16 wherein the dampers each comprise a housing and a piston in the housing to divide the space therein into the first and second chambers.

* * * * *